United States Patent

[11] 3,545,686

| [72] | Inventor | George Nelson Brown<br>Wilmington, Delaware |
|---|---|---|
| [21] | Appl. No. | 713,533 |
| [22] | Filed | March 15, 1968 |
| [45] | Patented | Dec. 8, 1970 |
| [73] | Assignee | E. I. du Pont de Nemours and Company<br>Wilmington, Delaware<br>a corporation of Delaware |

[54] SHREDDER
5 Claims, 3 Drawing Figs.

[52] U.S. Cl. .................................................. 241/47,
241/243
[51] Int. Cl. .................................................... B02c 18/44
[50] Field of Search .......................................... 241/190,
191, 195, 222, 243, 47, 48, 49, 52, 223, 239—242;
83/674(Cursory), 906(Cursory)

[56] References Cited
UNITED STATES PATENTS

| 1,402,199 | 1/1922 | Williams | 241/195 |
| 2,639,096 | 5/1953 | Hinerfeld | 241/222 |
| 2,803,410 | 8/1957 | Bodoni | 241/190 |
| 2,812,815 | 11/1957 | Quinsey | 83/906X |
| 3,244,049 | 4/1966 | Smith | 83/674X |

Primary Examiner—Theron E. Condon
Assistant Examiner—Donald G. Kelly
Attorney—Claude L. Beaudoin ABSTRACT: An apparatus for shredding sheets of polymeric materials is provided comprising a movable cutting blade having a sawtooth cutting edge and a stationary cutting blade having a sawtooth cutting edge disposed in a horizontal plane below and parallel to said movable cutting blade whereby the cutting edges of said blades interdigitate upon moving said movable cutting blade for piercing and tearing a sheet of polymeric material advanced across the stationary cutting blade.

PATENTED DEC 8 1970
3,545,686
SHEET 1 OF 2
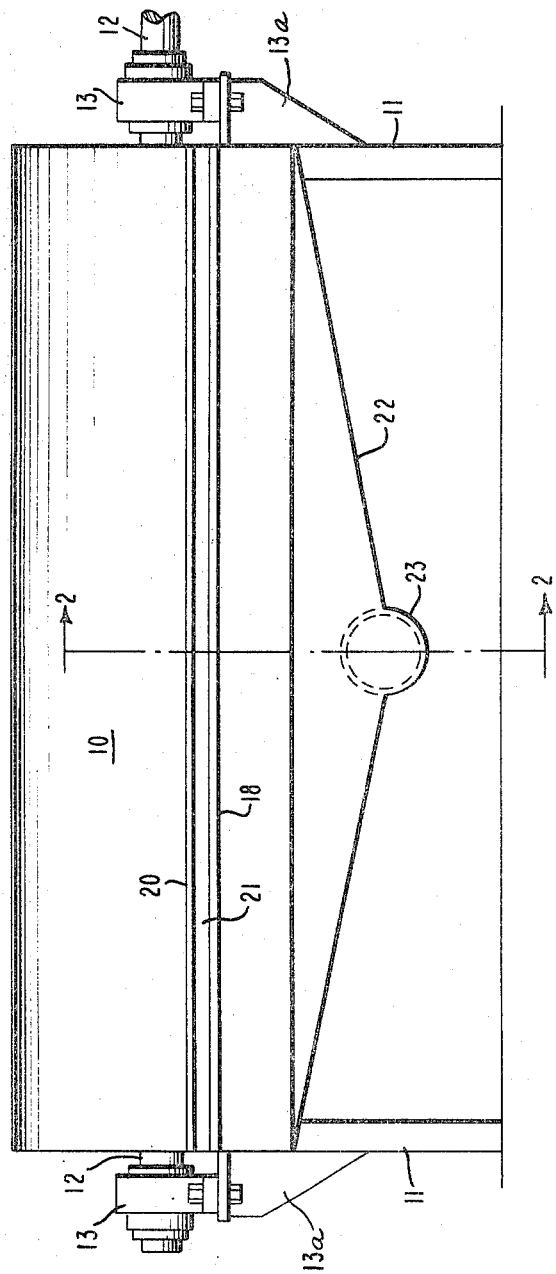
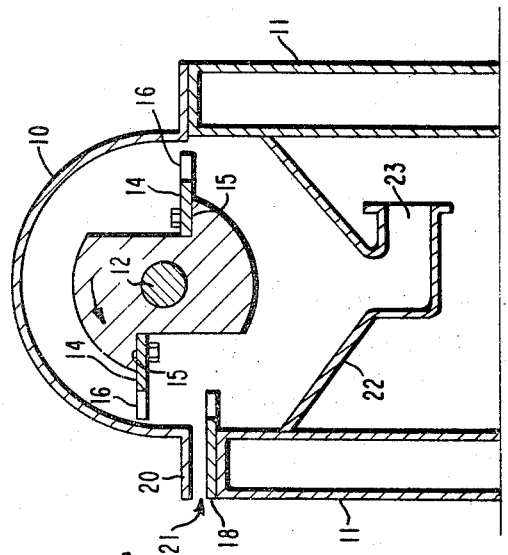
INVENTOR
GEORGE NELSON BROWN
BY Claude L. Beaudoin
ATTORNEY

SHREDDER

THE INVENTION

The present invention relates to an apparatus for comminuting materials and, more particularly, is directed to an apparatus for shredding sheet structures of organic polymeric material.

Sheet structures such as, for example, film structures, of organic polymeric material are ordinarily manufactured in the form of thin wide sheets which may exceed 15 feet in width and may be moving at speeds in excess of 200 yards per minute. The processes are often continuous and considerable quantities of film material are wasted due to unavoidable circumstances such as breakage. It is desirable to shred such waste film into small pieces for more convenient handling during the further processing thereof such as recovery and reuse.

Considerable difficulties have been encountered in the shredding operation, particularly for wide film (10 feet or more) and very thin films (less than 0.00025 inch) with conventional shredders. Most conventional shredders are either of the hammer mill type such as described in U.S. Pat. No. 3,030,035 or of the rotating blade-stationary blade type such as that described in U.S. Pat. No. 3,217,988. A drawback of the conventional shredders is that the hammer mill type functions best for brittle or relatively fragile materials rather than the tough flexible polymer films, and the rotating blade type requires close clearance gaps between the shearing blades. Accordingly, it is the principal object of the present invention to provide a shredding apparatus having an efficient, simple cutter mechanism capable of being fabricated to extra wide dimensions and having an extended working life with a minimum of maintenance and capable of handling very thin flexible sheets of polymeric material.

According to the present invention there is provided an apparatus for cutting and shredding sheets of polymeric materials comprising in cooperative association a movable cutting blade having a sawtooth cutting edge and a stationary cutting blade having a sawtooth cutting edge separated from each other by a gap of between about one-sixteenth inch and about one-quarter inch and interdigitated such that the movable sawtooth cutting blade is adapted to pierce and tear a sheet of polymeric material fed across the stationary cutting blade. In a preferred embodiment, the feeding of the polymeric sheet and the exhaust of the shredded material is urged by suction applied to the housing of the apparatus which coacts with the entrance or feed slot of the apparatus both to urge the sheet into the apparatus and to discharge the shredded material thereof.

The nature and advantages of the invention will be more clearly understood by the following description thereof considered in connection with the several views illustrated in the accompanying drawings wherein like reference characters refer to the same parts throughout the several views and in which:

FIG. 1 is an end elevation view of the apparatus;

FIG. 2 is a side cross-sectional view taken along line 2—2 of FIG. 1; and

Figure 3:
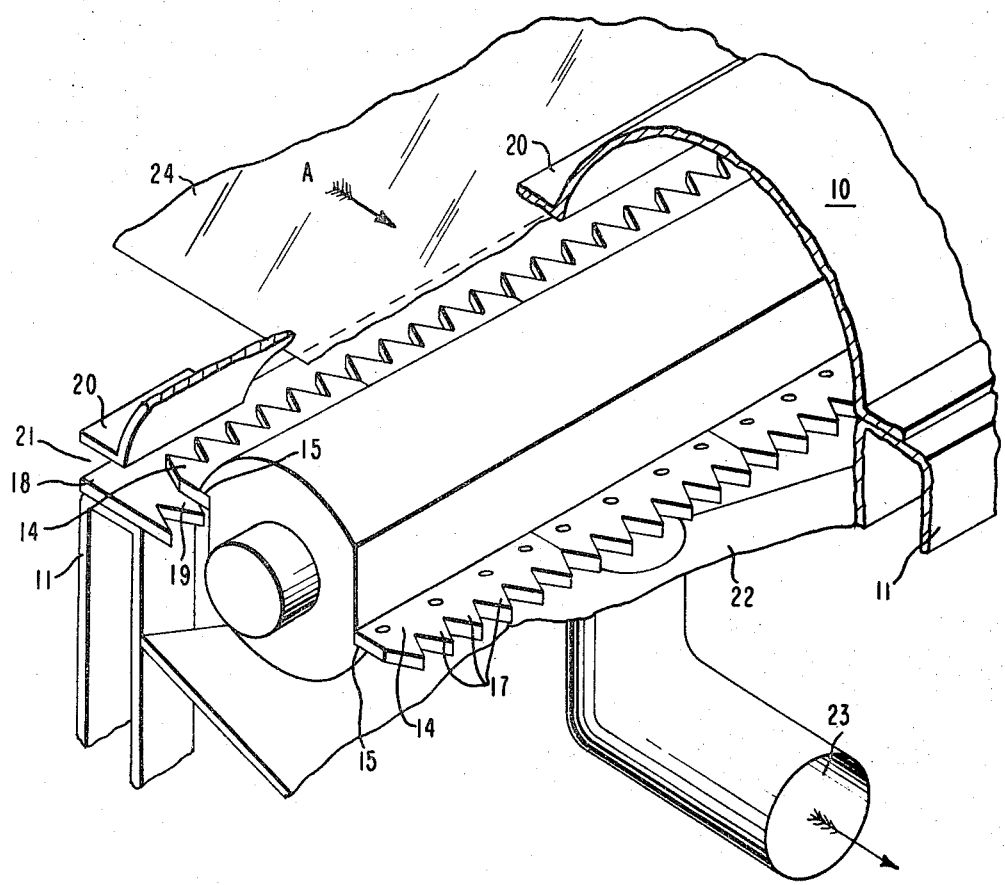
FIG. 3 is a partial isometric view showing the relationship of the basic elements of the apparatus of the present invention.

The apparatus herein disclosed in illustration of the present invention includes an upper housing assembly 10 supported by a suitable frame assembly 11. A rotatably mounted cylinder or shaft 12. A rotatably mounted cylinder or shaft 12 is disposed within housing assembly 10. Cylinder 12 is mounted at each end in suitable bearing means 13 secured to bearing supports 13a that are in turn secured to frame assembly 11, and cylinder 12 is adapted to be rotated by any suitable prime motive means (not shown) such as an electric motor. Cutting blades 14 are secured to recessed shoulders 15 of cylinder 12. The cutting blades 14 extend radially outwardly from cylinder 12 and terminate in a cutting edge 16 consisting of a plurality of V-shaped teeth 17 providing a sawtooth profile along the length of each cutting blade. A suitable cutting edge consists of preferably one or two V-shaped teeth 17 per lineal inch of blade 14.

The apparatus of the present invention further includes a stationary cutting blade 18 suitably secured to frame assembly 11. Stationary cutting blade 18 is of similar construction to blade 14 having a cutting edge also consisting of a plurality of V-shaped teeth 19 providing a sawtooth profile along its length. Stationary cutting blade 18 is disposed on frame assembly 11 in a manner as to (1) cooperate with cutting blades 14 on rotatable cylinder 12, as will be more fully explained hereinafter, and (2) provide, in cooperation with laterally extending flange 20 of housing assembly 10, a feed or entrance slot 21 through which polymeric material in sheet form is introduced or fed into the apparatus.

The apparatus of the present invention is further characterized by a lower housing assembly 22 suitably secured to frame assembly 11. The lower housing assembly 22 is provided with an outlet duct 23 adapted to be connected at its other end to a suitable fan device (not shown).

In operation, polymeric film material 24 is advanced in the direction of arrow A (FIG. 3) into the apparatus through slot 21. The film material advances over the cutting edge of stationary cutting blade 18 whereat it is shredded by the action of rotating cutting blades 14. The piercing and tearing action on the film material is brought about by the relative positioning of cutting blades 14 and 18. As shown in FIG. 2, stationary cutting blade 18 is offset below the central axis of cylinder 12, and as rotating cutting blades 14 pass by blade 18, the leading tips of the cutting edges of each cutting blade interdigitate at an angular attitude. The foregoing offset feature is of critical importance in shredding thin, flexible highly tenacious polymeric material, especially since substantially less energy is required to tear the polymeric material apart after it is pierced. The above described disposition of cutting blades also obviates physical contact between the respective cutting blades. The offset feature permits maintenance of a relatively wide gap spacing between the stationary and moving cutting blades with surprisingly no sacrifice of shredding efficiency. At the instance the sawteeth of the cutting blades are interdigitating, both blades are separated by a gap of between about one-sixteenth inch and about one-fourth inch or more (measured at right angles to the sides of the teeth). Thus, as the tips of the blade 14 pierce and engage the sheet of polymeric film, narrow strips of material approximately the width of a sawtooth are formed. The strips will be longer at higher feed rates than obtained at lower feed rates of film material.

An especially significant feature of the above described apparatus is that there is no need for critical alinement of the cutting blades and excessive wear of the cutting blades is eliminated. Once the sheet of polymeric film is chopped, the pieces are rapidly removed from the housing by means of the suction duct 23 to a remote waste storage bin for further processing.

It is noted that the high rotational speed of cutting blade 14 (about 1000 r.p.m.) generates a large amount of windage to the extent that a positive air pressure is created inside the apparatus. At startup, string-up of very thin polymeric film is very difficult due to blowout from the entrance slot 21. Consequently, slot 21 is proportioned to coact with the draft power of suction fan device (not shown) connected to outlet duct 23 so that slot 21 functions as an aspirator. Slot 21 is preferably sized to assure an air flow of about 2000 lineal feet per minute. For most situations, the air velocity in the slot 21 passageway should exceed three times the feed rate of polymeric sheet material in order to provide sufficient drawing of the sheet into the apparatus and adequate transfer of the shredded stock through outlet duct 23. An opening of slot 21 anywhere from one-half inch to 1 inch in height is satisfactory provided the air flow in the slot is turbulent.

The apparatus is capable of consuming polymeric film sheet material ranging anywhere from 0.1 mil to 14 mils in thickness at rates upwards of 2000 pounds per hour. The pierce and tear action greatly improves shredding efficiency such that the improved shredder utilizes one-tenth the horsepower requirements of conventional devices.

I claim:

1. Apparatus for shredding sheets of polymeric materials comprising a support frame, movable cutting blade means having a sawtooth cutting edge rotatably mounted on said frame, stationary cutting blade means having a sawtooth cutting edge of said movable cutting blade means and the cutting edge of said stationary cutting blade means interdigitate upon rotation of said movable cutting blade means to pierce and tear a sheet of polymeric film advanced across said stationary cutting blade.

2. The apparatus of claim 1 including suction fan means connected to an outlet duct of a housing enclosing said apparatus adapted to exhaust said shredded polymeric material and coact with a feed slot in said housing to feed said polymeric sheet material into said apparatus.

3. The apparatus of claim 1 having at least two movable cutting blades mounted on a cylinder rotatably secured to said frame.

4. The apparatus of claim 3 wherein the interdigitating teeth of said movable and stationary cutting blades are separated by a gap of between about one-sixteenth inch and about one-fourth inch.

5. The apparatus of claim 4 wherein the cutting edge of each of said movable and stationary cutting blades consists of at least one V-shaped tooth per lineal inch of each respective cutting blade.

PO-1050
(5/69)

UNITED STATES PATENT OFFICE
CERTIFICATE OF CORRECTION

Patent No. 3,545,686          Dated December 8, 1970

Inventor(s)          George Nelson Brown

It is certified that error appears in the above-identified patent and that said Letters Patent are hereby corrected as shown below:

Column 3, line 6, after the word "edge" insert -- secured said frame in a horizontal plane below and parallel to the horizontal plane of the cutting edge --; Column 3, line 6, af the word "means" insert -- whereby the cutting edge of said movable cutting blade means -- .

Signed and sealed this 20th day of April 1971.

(SEAL)
Attest:

EDWARD M. FLETCHER, JR.          WILLIAM E. SCHUYLER, JR.
Attesting Officer          Commissioner of Patents